UNITED STATES PATENT OFFICE.

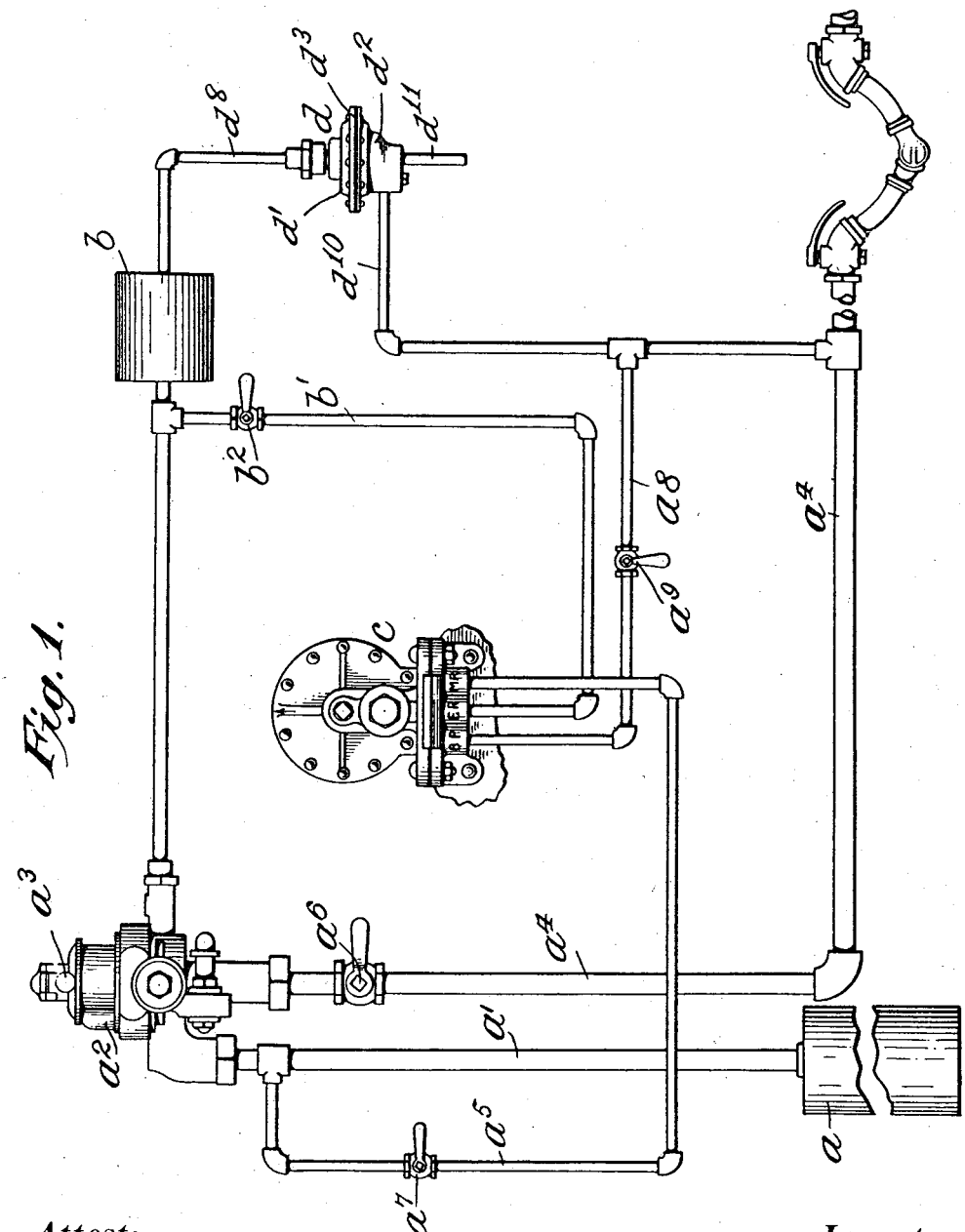

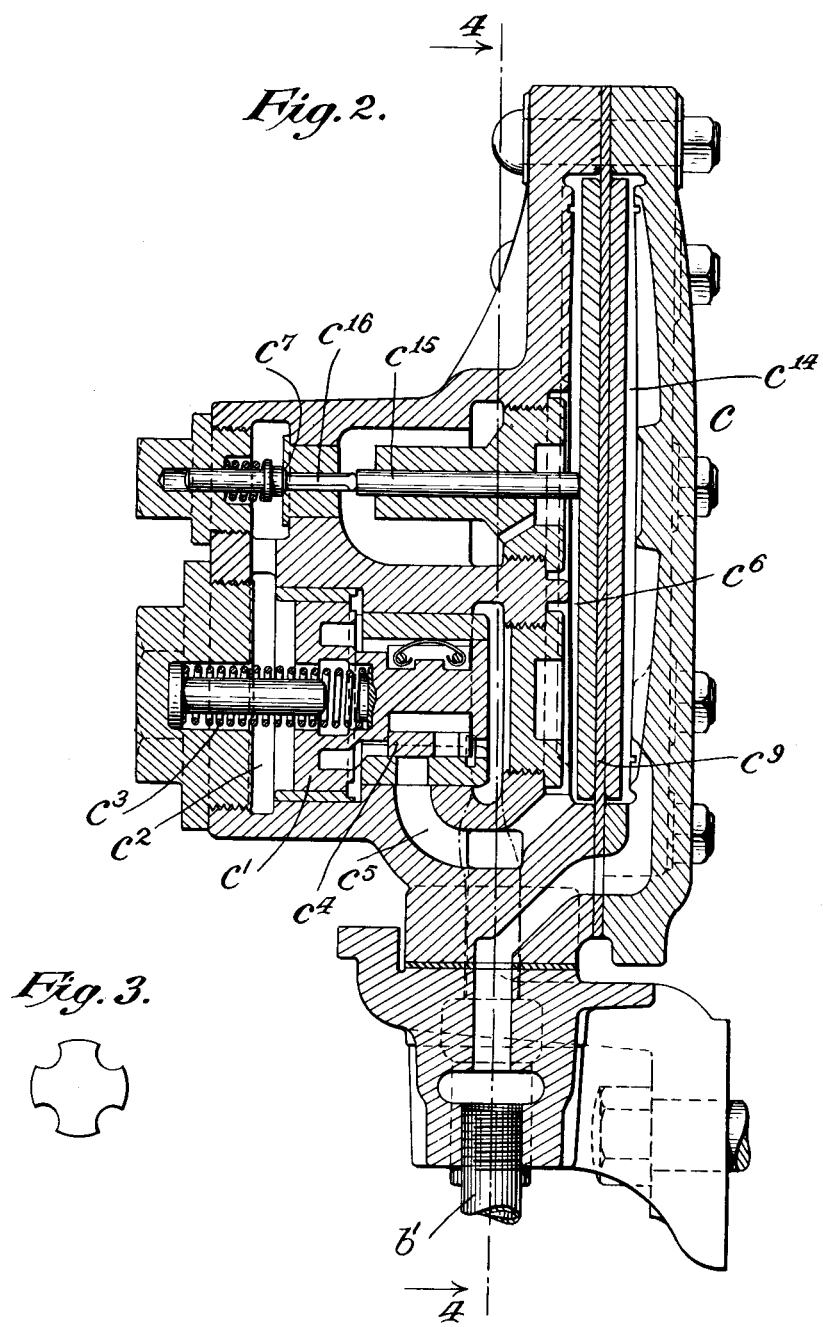

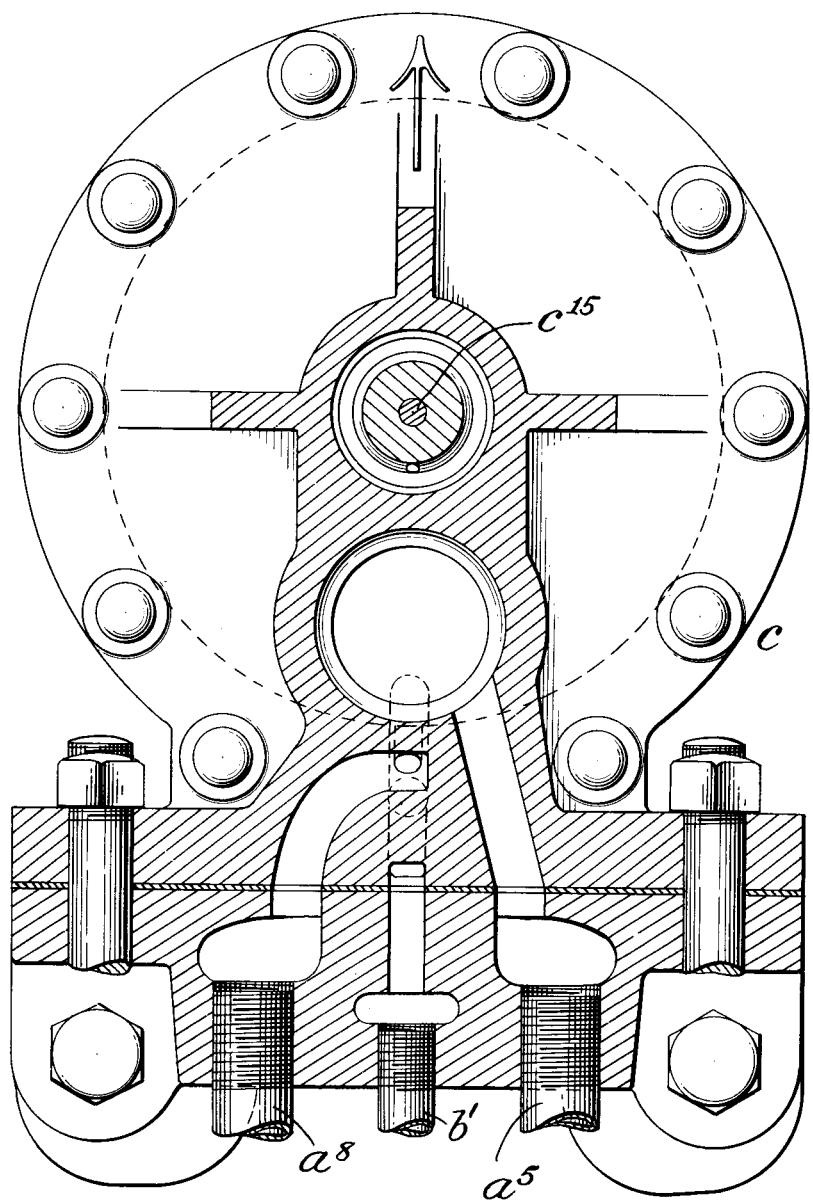

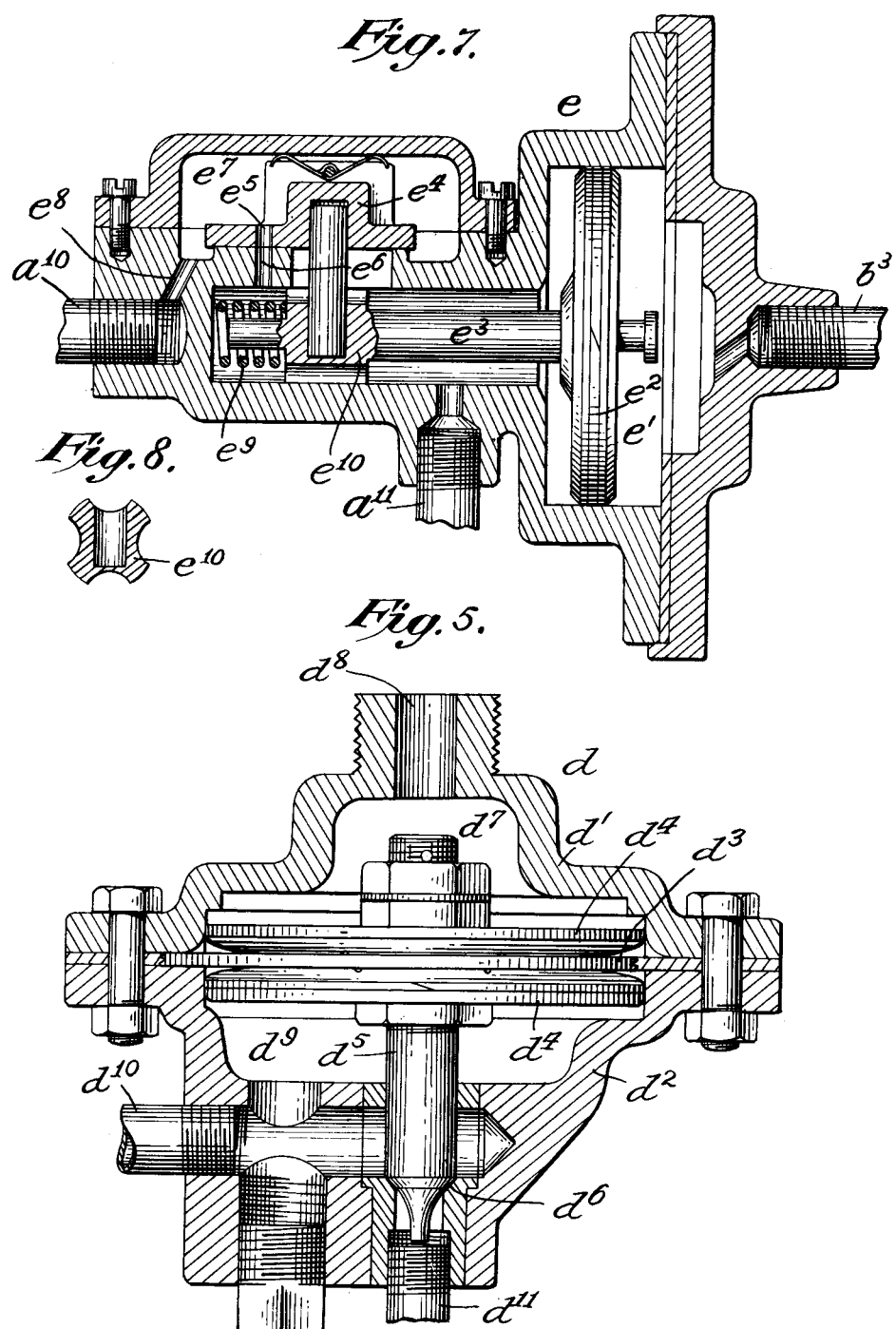

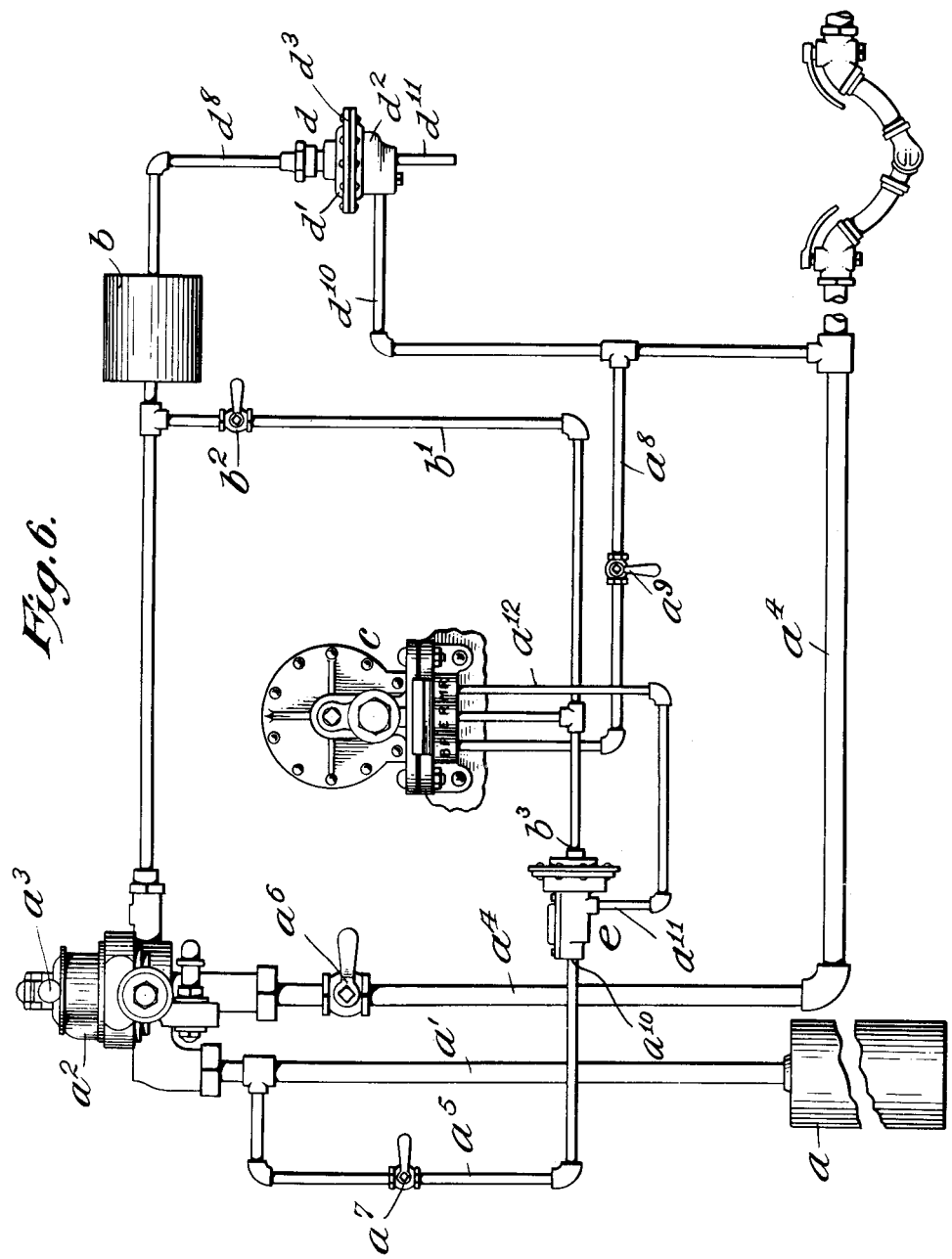

WILLIAM H. SAUVAGE, OF NEW YORK, N. Y., ASSIGNOR TO SAUVAGE WARD BRAKE COMPANY, INC., A CORPORATION OF DELAWARE.

FLUID-PRESSURE BRAKE SYSTEM.

1,117,254.  Specification of Letters Patent.  Patented Nov. 17, 1914.

Application filed February 15, 1912. Serial No. 677,782.

*To all whom it may concern:*

Be it known that I, WILLIAM H. SAUVAGE, a citizen of the United States, residing in New York city, New York county, State of New York, have invented certain new and useful Improvements in Fluid-Pressure Brake Systems, of which the following is a specification, reference being had to the accompanying drawings, which form a part hereof.

This invention relates to a fluid pressure brake system in which the locomotive or engineer's equipment includes a sustaining valve by which the train-pipe or brake-pipe pressure is maintained automatically notwithstanding leaks in the train-pipe, while the pressure is at all times under the control of the engineer and variable at his will. It is possible that in such a structure as that which embodies the sustaining valve referred to, the feed valve, which controls the admission of air from the main reservoir to the train-pipe might fail to close completely so that air would continue to be admitted directly from the main reservoir to the train-pipe or brake-pipe independently of the engineer's valve. Under these conditions it might happen that the reduction of pressure in the train-pipe necessary to an application of the brakes would be impossible, the reduction of air through the engineer's valve being immediately compensated for by the air thus admitted directly from the main reservoir, so that a service application of the brakes would be impossible, although an emergency application of the brakes would still be possible.

It is the object of this invention to prevent such an occurrence and in accordance with the invention, means are provided whereby, under such conditions as those referred to, the excess of pressure which is permitted to pass the sustaining valve is vented directly into the atmosphere instead of being discharged into the train-pipe or brake-pipe. Incidentally to the accomplishment of this main object of the invention other highly desirable results are also secured, as will be pointed out hereinafter. An additional safeguard may also be supplied by the provision of other means whereby, under the conditions referred to, the flow of air from the main reservoir may be prevented or regulated, but for all ordinary purposes the means first referred to are sufficient.

The invention will be more fully explained hereinafter with reference to the accompanying drawings in which it is illustrated and in which—

Figure 1 is a partly diagrammatic or outline view showing so much of the engine equipment of a fluid pressure brake system as is necessary to enable the application of the invention thereto to be understood. Fig. 2 is a detail view in axial, vertical section and on a larger scale of the form of sustaining valve shown in Fig. 1. Fig. 3 is a detail view of the slide-valve piston stem shown in Fig. 2. Fig. 4 is a detail view of the sustaining valve in section on the plane indicated by the broken line 4—4 of Fig. 2, looking in the direction of the arrows. Fig. 5 is a detail view of the safety valve shown in Fig. 1. Fig. 6 is a view similar to Fig. 1 but showing an additional safety device or cut-out and regulating valve. Fig. 7 is a detail view of the additional safety device and regulating valve shown in Fig. 6. Fig. 8 is a detail view of the guide head shown in Fig. 7.

In the arrangement represented in Figs. 1 and 6 of the drawings the main reservoir $a$ or other usual source of air under pressure is shown as connected by a suitable pipe $a'$ with the engineer's valve $a^2$, which may be of any usual or suitable construction, being shown as provided with the usual controlling handle $a^3$, and with the train-pipe $a^4$. The latter, provided with the cut-out cock $a^6$ on the engine and with the usual fittings and connections for the several cars, extends throughout the train. Connected with the main reservoir $a$ through the engineer's valve $a^2$ and also located on the engine is an equalizing reservoir $b$, which is also connected by a pipe $b'$, provided with a suitable cut-out cock $b^2$, with the sustaining valve $c$, which will be described hereinafter so far as is necessary for an understanding of the present invention. Connection is also made from the main reservoir or other source of supply to the sustaining valve $c$ by a pipe $a^5$ provided with a cut-out cock $a^7$, and from the sustaining valve $c$ to the train-pipe $a^4$ by a branch-pipe $a^8$, also provided with a cut-out cock $a^9$.

The car equipment may be constructed and arranged in any usual or suitable manner and need not be shown or described herein, the present invention not being concerned therewith.

The several cut-out cocks $a^6$ $a^7$ $a^9$ and $b^2$ are shown for convenience of illustration as if closed, but it will be understood that in the normal operation of the system they are open.

The construction of the sustaining valve $c$, shown in detail in Figs. 2, 3 and 4 forms no part of the present invention, but its construction will be described briefly in order that the relation of the present invention thereto may be understood. It comprises a somewhat loosely fitting piston $c'$ which is subject on one side to the main reservoir pressure and on the other side to the back pressure in the channel $c^2$ behind it and to the action of a spring $c^3$, the piston $c'$ carrying a slide valve $c^4$ which controls communication between the main reservoir through the pipe $a^5$ and the train-pipe through the branch $a^8$. The channel $c^5$, to which air under pressure is admitted by the valve $c^4$, also communicates with a diaphragm chamber $c^6$ and the latter communicates with the channel $c^2$ through a check or regulating valve $c^7$. The diaphragm $c^9$ stands between the chamber $c^6$ and a chamber $c^{14}$ which communicates with the equalizing reservoir through the pipe $b^1$ and acts through the guide stem $c^{15}$ and the channeled stem $c^{16}$ to unseat the check or regulating valve $c^7$ when the pressure in the train-pipe is reduced and thereby to vent the channel $c^2$ into the train-pipe and relieve the pressure behind or on the left hand face of the piston $c^1$, to permit the piston $c^1$ to move under the pressure from the main reservoir to open the valve $c^4$ and to admit air under pressure from the main reservoir to the train-pipe through the channel $c^5$ to build up the pressure in the train-pipe until such pressure is sufficient to balance on the left hand side of the diaphragm $c^9$ the pressure from the equalizing reservoir on the right hand side of that diaphragm. The spring $c^3$ tends to return the piston $c^1$ to its right hand position to close the valve $c^4$ and shut off communication between the main reservoir and the train-pipe while at the same time the pressure on the left hand face of the diaphragm $c^9$ is increased so that the diaphragm is moved to the right against the pressure from the equalizing reservoir and the check or regulating valve $c^7$ is permitted to seat itself under the influence of its spring and thereby to shut off communication between the channel $c^2$ and the channel $c_5$ until the pressure in the train-pipe is again reduced. Since the diaphragm $c^9$ is subject on the right hand side to the pressure in the equalizing reservoir, which is always under the control of the engineer, this construction provides for maintaining automatically the pressure in the train-pipe at a degree determined by the engineer. This sustaining or equalizing valve, therefore, is a differential valve, depending for its operation upon the differential of pressures in the equalizing reservoir $b$ and in the train pipe and is very delicate and sensitive in its operation so that the train-pipe pressure is automatically maintained, notwithstanding leaks in the train-pipe, in substantial equality with that in the equalizing reservoir $b$, which, as stated, is always under the control of the engineer.

It may happen, through some unforeseen cause, that the valve $c^4$ does not close completely and under such conditions, without the provision of the safety device or devices hereinafter described, the air from the main reservoir would continue to flow into the train-pipe, maintaining therein the pressure which the engineer seeks to reduce, through manipulation of the engineer's valve, for the purpose of bringing about the service application of the brakes and thereby preventing such service application, although, as will be understood, it would not prevent an emergency application. Such a result is prevented, in accordance with the present invention, preferably by venting or permitting the escape into the atmosphere of the air which thus flows through the sustaining valve, thereby preventing its discharge into the train-pipe and therefore preventing the building up of the pressure in the train-pipe at a time when it should be reduced, or by preventing by other means or rather by regulating the flow of air from the main reservoir to the train-pipe according to the requirements regardless of the leaking through the sustaining valve. Both means provided for the purpose may be employed together or either means by itself, but for all ordinary purposes the first named means will be found sufficient. Such means will now be described.

The relation of the preferred safety device to the other parts of the engine equipment is shown in Figs. 1 and 6, where such device is represented in elevation at $d$, while the internal construction is shown in detail in Fig. 5. The device comprises a casing conveniently made in two parts $d^1$ and $d^2$, a diaphragm $d^3$, preferably backed on each side by a piston $d^4$ so that the device will be operative even if the diaphragm, which is itself absolutely air-tight, should be ruptured, a valve plug $d^5$ which is carried by the diaphragm and piston, and a valve seat $d^6$. The diaphragm chamber $d^7$ is connected by a suitable pipe $d^8$ with the equalizing reservoir $b$, so that the diaphragm shall be subjected on one side to the pressure in the equalizing reservoir. The diaphragm chamber $d^9$ is connected by a branch $d^{10}$ with the train-pipe, so that the diaphragm is subjected on the other side to the pressure in the train-pipe. The valve $d^5$ controls communication between the diaphragm chamber $a^9$ and therefore the train-pipe and the atmosphere through a suitable pipe $d^{11}$. The device is therefore a differential valve, depending for its operation upon the differential of pressures in the equalizing reservoir and in the train-pipe and controlling direct communication between the train-pipe and the atmosphere. So long as the pressure in the equalizing reservoir is in excess of the pressure in the train-pipe the valve $d^5$ is held closed, but as soon as the pressure in the diaphragm chamber $d^9$, or in the train-pipe, is in excess of the pressure in the equalizing reservoir the valve $d^5$ is held open and the excess of pressure in the train-pipe is vented into the atmosphere. Therefore if the sustaining valve leaks so as to permit air from the main reservoir to flow continuously into the train-pipe the excess of pressure thus created in the train-pipe, even though slight, above the pressure in the equalizing reservoir, opens the valve $d^5$ and permits such excess of pressure to be vented directly into the atmosphere. Accordingly, if the engineer makes a reduction of pressure in the equalizing reservoir for the purpose of making a service application of the brakes he is not prevented from making such application by any leakage through the sustaining valve for the reason that the excess of pressure in the train-pipe above the pressure in the equalizing reservoir (which is determined by the engineer), is immediately vented to the atmosphere through the opening of the valve $d^5$. Furthermore, although the operation of this safety device is automatic and prevents the harmful effect of leakage through the sustaining valve without action on the part of the engineer, the safety device also operates as a warning to the engineer, the escape of air through the exhaust pipe $d^{11}$ immediately calling the attention of the engineer to the fact that the safety device is in operation so that he can, if desirable, cut out the sustaining valve altogether by closing the cut-out cock $a^7$ in the branch $a^5$ from the main reservoir. It will be observed that the valve $d^5$ normally remains closed since the diaphragm is unbalanced to a degree represented by the ratio of the area of the end of the valve $d^5$ to the area of the diaphragm. To open the valve the train-pipe pressure must exceed the equalizing reservoir pressure and the valve then opens to an extent proportionate to the excess of pressure admitted to the train-pipe from the main reservoir through the leaky or defective sustaining valve.

While the main purpose of the safety device $d$ is to prevent the harmful effect of a leakage through the sustaining valve, other beneficial results follow from its use. Thus, it acts to accelerate the reduction of pressure in the train-pipe under ordinary conditions, even when the sustaining valve is in good order, for when the engineer effects the desired reduction in the equalizing reservoir $b$ and then moves his valve handle to lap position, the valve $d^5$ opens by reason of the reduction in the equalizing reservoir and remains open until the pressure in the train-pipe is equalized with that in the equalizing reservoir, thus permitting the rapid reduction of the pressure in the train-pipe. If the engineer's valve becomes deranged so that the air from the main reservoir passes into the train pipe and not into the equalizing reservoir to the extent intended, then the valve $d^5$ will immediately open and the engineer will be warned through the escape of air through the exhaust $d^{11}$, the valve $d^5$ operating at this time by reason of the preponderance of pressure on the train pipe side thereof, as will be understood. Even under these conditions the engineer can still make a service application of the brakes because such a derangement of the engineer's valve is taken care of by the safety device in the same way that leakage through the sustaining valve is taken care of. If the leakage either through the sustaining valve or through the engineer's valve is so slow that the escape of air through the exhaust $d^{11}$ is not audible to the engineer, the valve $d^5$ will nevertheless be opened wider as soon as the engineer makes a reduction in the pressure in the equalizing reservoir and will stay open, permitting the service application of the brakes to be made as befoer. Again, should the train-pipe cut-out $a^6$ be closed and be left closed by the engineer, it will still be possible for the engineer to make a service application of the brakes for the reason that as soon as the engineer makes the necessary reduction in the equalizing reservoir pressure the valve $d^5$ will open and permit the pressure in the train-pipe to be relieved through the exhaust $d^{11}$ even though the cut-out cock $a^6$ is closed.

It has been seen that the safety device $d$ may be operative with highly beneficial results even though the sustaining valve is in good order and permits no leakage. It may coöperate, therefore, with the additional safety device which is shown at $e$ in Fig. 6, in its relation to the rest of the engine equipment and is shown in detail in Fig. 7, the primary purpose of which is to provide for cutting off the main reservoir pressure in case of leakage of the sustaining valve, although the danger of trouble by reason of a defect in the sustaining valve is removed so far by the safety device $d$ that reasonable caution does not require the use of the additional safety device $e$. The additional safety device $e$ comprises a casing which is connected at $a^{10}$ to the branch $a^5$ and through that to the main reservoir, is connected at $a^{11}$ by the branch $a^{12}$ to the sustaining valve, and is connected at $b^3$ to the pipe $b^1$ which connects the equalizing reservoir to the sustaining valve. Within the casing is a piston chamber $e^1$ in which is a piston $e^2$ which is subject on one side to the pressure in the equalizing reservoir through the connection $b^3$ and on the other side to the train-pipe pressure when the sustaining valve is open or leaks and otherwise to the main reservoir pressure through the connection $a^{10}$. The stem $e^3$ of the piston $e^2$ carries a slide valve $e^4$ which has a port $e^5$ adapted to register with a port $e^6$ in the seat of the slide valve, the slide valve chamber $e^7$ being in communication with the main reservoir through the channel $e^8$ and the connection $a^{10}$.

Let it be assumed that conditions are normal and that the piston $e^2$ is in its right hand position. If now the sustaining valve opens or leaks and the train-pipe pressure is less than the equalizing reservoir pressure the piston $e^2$ will be moved to the left into the position shown in Fig. 7 thus placing the port $e^5$ in registration with the port $e^6$ and establishing communication with the main reservoir. The main reservoir pressure thus admitted will build up the train-pipe pressure. If there are leaks in the train-pipe the air thus admitted from the main reservoir will compensate for the leaks, the safety device thus acting in this way to fulfil the function of the sustaining valve $c$ and taking its place. If the train-pipe pressure is thus built up above the equalizing reservoir pressure then the pressure on the left hand face of the piston $e^2$ over-balances the equalizing reservoir pressure on the right hand face and moves the piston to the right thus moving the port $e^5$ out of registration with the port $e^6$ and shutting off the air from the main reservoir. So long as the pressure against the left hand face of the piston $e^2$ continues in excess of the equalizing reservoir pressure, even slightly, the air from the main reservoir is cut off so that any reduction in the equalizing reservoir pressure by the engineer for the purpose of effecting the service application of the brakes is accompanied by the corresponding reduction in the train-pipe pressure and the service application of the brakes therefore is not interfered with. On the other hand, if the train-pipe pressure is reduced substantially below the equalizing reservoir pressure by leaks in the train-pipe, the piston $e^2$ is moved to the left to admit more air from the main reservoir to compensate for such leaks, whereby this additional safety device acts as a sustaining valve. The main purpose, however, as stated, is, by cutting off the connection to the main reservoir when the pressure in the train-pipe exceeds that in the equalizing reservoir, to prevent the building up of the train-pipe pressure to a degree which would interfere with the service application of the brakes even if the sustaining valve $c$ should leak.

In case of a sudden rupture of the train-pipe or of an emergency application of the brakes the piston $e^2$ would be thrown to the left and would be held in that position by the pressure on the right-hand side of the piston, there being then only atmospheric pressure on the left-hand side of the piston. If the slide-valve $e^4$ moved only to the normal position shown in Fig. 7, with the ports $e^5$ and $e^6$ in registration, the air from the main reservoir would escape. To prevent this waste of air provision is made whereby the slide-valve, under such circumstances, may be moved to the left beyond the normal position shown and close the port $e^6$, preventing the escape of air. When the engineer restores the pressure in the train-pipe through his engineer's valve, after the rupture is repaired the light spring $e^9$ at the right of the guide head $e^{10}$ moves the slide-valve to the right into the normal position represented.

While the safety device and regulating valve $e$ may be used in conjunction with the safety device $d$, as an additional precaution against the results of accident, the device $d$ alone will generally be deemed sufficient, not only because the possibility of inoperativeness of both the sustaining valve $c$ and the safety device $d$ at the same time is very remote, but also because the construction of the safety device itself which is such as to make it almost impossible for the safety device to become inoperative through accident. It will be understood that the safety device can be placed wherever convenience may suggest and that its construction can be varied to suit different conditions of use, it being necessary only that it shall be subject to the pressure in the train-pipe and to the pressure in the reservoir and shall be controlled by the differential of such pressures to determine the venting of the train-pipe to the atmosphere. The invention therefore is not limited to the particular construction and arrangement of parts shown and described herein.

I claim as my invention:—

1. In a fluid pressure brake system, the combination of a source of pressure of an equalizing reservoir, a train-pipe, an engineer's valve, a sustaining valve connected to the source of pressure, the equalizing reservoir and the train-pipe, and independent means actuated by the differential of pressure in the equalizing reservoir and the train-pipe for controlling exhaust from the train-pipe to atmosphere.

2. In a fluid pressure brake system, the combination of a source of pressure an equalizing reservoir, a train-pipe, an engineer's valve, a sustaining valve connected to the source of pressure, the equalizing reservoir and the train-pipe, an independent valve to control the exhaust from the train-pipe to atmosphere, and means subject to the differential of pressure in the equalizing reservoir and the train-pipe to control said valve.

3. In a fluid pressure brake system, the combination of a source of pressure, a train-pipe, an equalizing reservoir, an engineer's valve, a connection from the source of pressure to the engineer's valve, a connection from the engineer's valve to the train-pipe, a connection from the engineer's valve to the equalizing reservoir, an independent connection from the source of pressure to the train-pipe, said last named connection being provided with an exhaust opening and means subject to the differential of pressure in the equalizing reservoir and the train-pipe to control said exhaust opening.

4. In a fluid pressure brake system, the combination of a source of pressure, a train-pipe, an equalizing reservoir, an engineer's valve, a connection from the source of pressure to the engineer's valve, a connection from the engineer's valve to the train-pipe, a connection from the engineer's valve to the equalizing reservoir, an independent connection from the source of pressure to the train-pipe, said last named connection being provided with an exhaust opening, a valve to control said exhaust opening, and a diaphragm controlling said valve and subject on one side to the pressure in the equalizing reservoir and on the other side to the pressure in the train pipe.

5. In a fluid pressure brake system, the combination of a source of pressure, a train-pipe, an equalizing reservoir, a connection between the source of pressure and the train-pipe, a sustaining valve subject to the differential of pressures in the equalizing reservoir and the train-pipe to control the communication between the source of pressure and the train-pipe, and additional means subject to the differential of pressures in the equalizing reservoir and the train-pipe to regulate the admission of air from the source of pressure to the train-pipe.

6. In a fluid pressure brake system, the combination of a source of pressure, a train-pipe, an equalizing reservoir, a connection between the source of pressure and the train-pipe, a sustaining valve subject to the differential of pressures in the equalizing reservoir and the train-pipe to control the admission of air from the source of pressure to the train-pipe, and a safety device interposed in the connection between the source of pressure and the sustaining valve and subject to the differential of pressures in the equalizing reservoir and the train-pipe to control said connection.

7. In a fluid pressure brake, the combination with a train pipe, of a valve mechanism for normally feeding air to the train pipe to a predetermined degree and means operating upon an increase in the train pipe pressure above said predetermined degree for cutting said valve mechanism out of action.

8. In a fluid pressure brake, the combination with a train pipe, of a valve mechanism for normally feeding air to the train pipe to a predetermined degree and means operating upon an increase in the train pipe pressure above said predetermined degree for preventing said valve mechanism from feeding air to the train pipe.

9. In a fluid pressure brake, the combination with a train pipe, of a feed valve mechanism for normally maintaining the train pipe pressure at a predetermined degree and a valve device operating upon an increase in train pipe pressure above said predetermined degree for cutting said feed valve mechanism out of action.

This specification signed and witnessed this 10th day of February, A. D., 1912.

WILLIAM H. SAUVAGE.

Signed in the presence of—
W. B. GREELEY,
WORTHINGTON CAMPBELL.